United States Patent [19]

Matsuoka

[11] Patent Number: 5,331,677
[45] Date of Patent: Jul. 19, 1994

[54] PRESSURIZED WATER REACTOR PLANT
[75] Inventor: Tsuyoshi Matsuoka, Tokyo, Japan
[73] Assignee: Mitsubishi Jukogyo Kabushiki Kaisha, Tokyo, Japan
[21] Appl. No.: 22,940
[22] Filed: Feb. 26, 1993
[30] Foreign Application Priority Data Feb. 27, 1992 [JP] Japan .................. 4-041558

[51] Int. Cl.$^5$ .............................. G21C 15/00
[52] U.S. Cl. .................... 376/402; 376/405
[58] Field of Search ............ 376/402, 404, 405, 406

[56] References Cited

U.S. PATENT DOCUMENTS

| 3,547,187 | 12/1970 | Cook et al. | 376/402 |
| 4,587,079 | 5/1986 | Fajeau et al. | 376/405 |

FOREIGN PATENT DOCUMENTS

| 0418701 | 3/1991 | European Pat. Off. | |
| 60-195487 | 10/1985 | Japan | 376/402 |
| 4-109197 | 4/1992 | Japan. | |
| 983263 | 2/1965 | United Kingdom. | |
| 1491534 | 11/1977 | United Kingdom. | |

Primary Examiner—Daniel D. Wasil
Attorney, Agent, or Firm—Jacobson, Price, Holman & Stern

[57] ABSTRACT

A pressurized water reactor plant includes a reactor vessel (1), a reactor coolant pump (5) having an inlet connected by coolant pipe (2) to an outlet of the reactor vessel, a steam generator (10) having an inlet connected by a high-temperature side pipe (4) to the outlet of the pump (5) and an outlet connected by low-temperature side pipe (6) to an inlet of the reactor vessel. The steam generator has a horizontally extending shell (11) in the interior of which are horizontal U-shaped tube bundles (30) supported on tube support plates (20) and a pair of separator plates (18) which divide the interior of the shell into downcomer space (19). A partition plate (21) divides the interior of the shell into a U-shaped tube region (16) and a straight tube region (17). A moisture separator (27) is disposed above the heat transfer tubes (15) and a drain pipe (28) extends therefrom for draining impurities from the moisture separator to the U-shaped tube region (16) to which blowdown pipe (26) is connected.

6 Claims, 7 Drawing Sheets

PRESSURIZED WATER REACTOR PLANT

BACKGROUND OF THE INVENTION

The present invention relates to a pressurized water reactor plant and, more particularly, the arrangement of various components constituting a primary reactor cooling system therefore.

Figure 9:
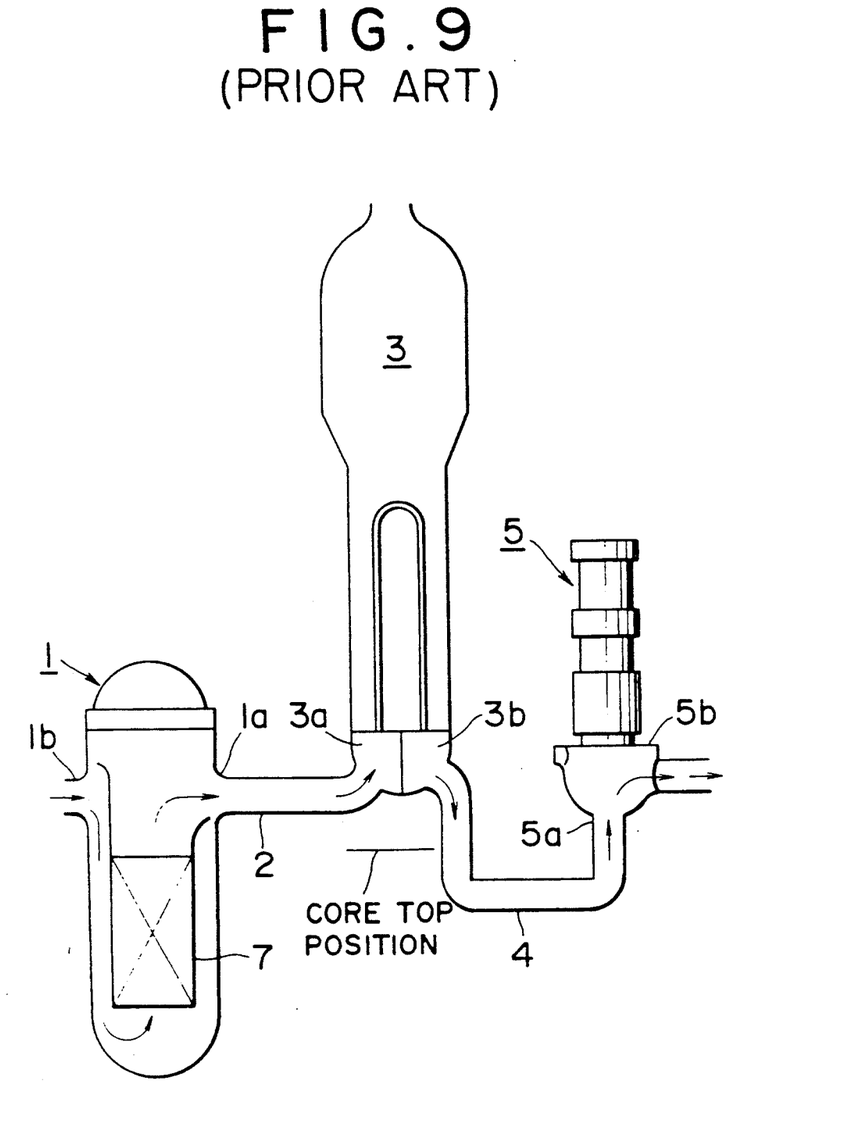
FIG. 9 is an elevational view of the main portion of a conventional pressurized water reactor plant.

FIG. 9 shows a typical arrangement of components, such as a reactor vessel and steam generator, constituting a primary cooling system of a conventional pressurized water reactor plant. A high-temperature side pipe 2 of the primary cooling system, which pipe is connected to the outlet nozzle 1a of a reactor vessel 1, communicates with the high-temperature side water chamber 3a of a vertical type steam generator 3. A substantially U-shaped pipe 4, referred to as crossover leg hereinafter, communicating with the low-temperature side water chamber 3b of the steam generator 3 is connected to the suction port 5a of a reactor coolant pump 5. The discharge port 5b of the pump is connected to a low-temperature side pipe (not shown) communicating with the inlet nozzle 1b of the reactor vessel 1.

In such a design that the installations or components are connected as described above, the bottom of the U-shaped pipe (crossover leg) lies below the upper portion of a nuclear core 7 in the reactor vessel 1 as seen from FIG. 9.

The applicant previously proposed a pressurized water reactor plant employing a horizontal type steam generator instead of the vertical type steam generator so that the steam generator can be used not only for generating steam in normal operation but also as a heat exchanger for removing decay heat in a core during a loss of coolant accident (Japanese Patent Application No. 401077/1990, European Patent Application No. 90117428.4)

Figure 10:
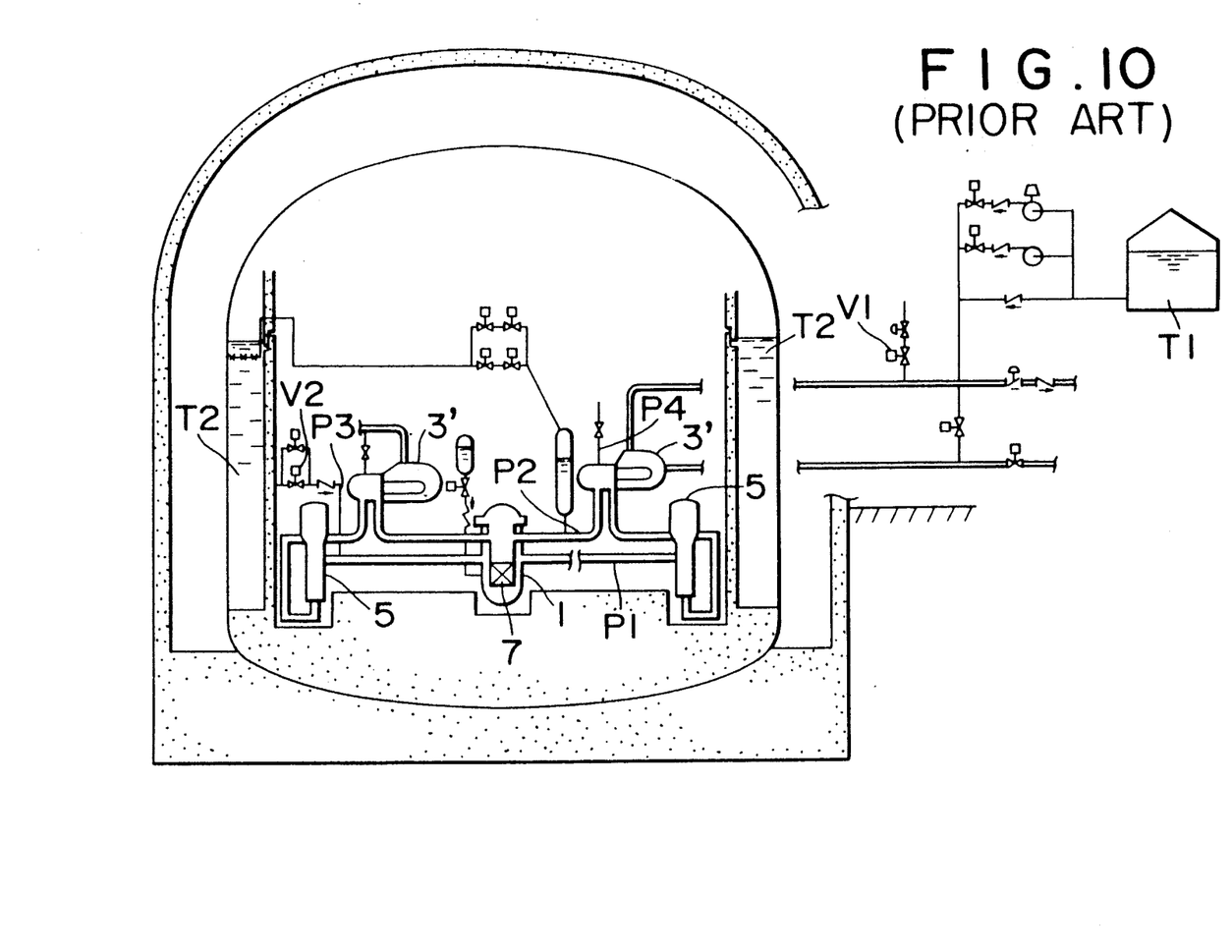
FIG. 10 is a schematic view of a pressurized water reactor plant according to prior Japanese Patent Application No. 401077/1990 filed by the applicant of the present application.

As seen from FIG. 10, the pressurized water reactor plant disclosed in Japanese Patent Application No. 401077/1990 comprises a condensate tank T1 which is disposed above a secondary cooling system and communicates with the second cooling system via a pipe having a valve, a pressure reducing valve V1 connected to the secondary cooling system, and a gravity flow tank T2 which is partially disposed above a low-temperature side pipe P1 and a high-temperature side pipe P2 of the primary cooling system. Further, the gravity flow tank T2 communicates with a reactor vessel 1 via the pipe P3 provided with a valve V2. Steam generators 3' are installed extending horizontally and have a vent pipe P4 connected to the high-temperature side water chamber. The gravity flow tank T2 has a water capacity sufficient to submerge at least the high-temperature side and low-temperature side pipes P2 and P1 under discharged water when the valve V2, which is disposed in the pipe P3 connected to the gravity flow tank T2, is opened.

In the pressurized water reactor plant mentioned above during a normal reactor operation, the primary coolant which enters the reactor vessel 1 through the low-temperature side pipe P1 connected to the inlet nozzle of the reactor vessel 1 is heated in the nuclear core 7, and flows out of the outlet nozzle of the reactor vessel 1. Then, the primary coolant thus heated passes through the high-temperature side pipe P2, and reaches the low-temperature side water chamber after flowing through the high-temperature side water chamber of the steam generator 3' and the inside of U-shaped heat transfer tubes. Thereafter the primary coolant is pumped by a coolant pump 5, into the reactor vessel 1 again.

While, in the arrangement of the pressurized water reactor plant described above, the natural circulation flow of the reactor coolant through the heat transfer tubes is not prevented (or is sustained), as described in the specification of the above patent application, during a reduced pressure condition in the primary cooling system, which follows from an accident of coolant loss, such that major postulated design basis accident such as core melting by decay heat can be prevented, because the steam generator 3' is installed laterally extending and the high-temperature side water chamber therein is provided with a pipe P4 having a valve. In order to remove the decay heat through heat exchange with a secondary coolant or feedwater in the steam generator 3' by using gravity circulation, the pressure in the secondary cooling line is decreased by operating the pressure reducing valve V1 connected to the secondary cooling system, and the water in the condensate tank T1 is poured into the secondary cooling system under head difference by opening the valve of condensate tank T1 disposed above the secondary cooling systems. Thus the water poured into the secondary cooling system is heat exchanged with the primary coolant flowing through the heat transfer pipe under natural circulation thereby removing the decay heat generated in the nuclear core 7 of the steam generators 3'. Since the steam generator 3' is one of essential components of the primary cooling system, the use of this component eliminates the need for additional equipment, thereby enabling simplification of facility and improvement in economy. Also, since the steam generator 3' is originally designed to remove heat generated in the nuclear core during a normal operation, it has an excellent and sufficient cooling capacity.

Therefore, the invention disclosed in Japanese Patent Application No. 401077/1990 can provide a passive core decay heat removing system which can remove decay heat in a substantially passive manner with the minimum use of active components of high reliability such as valves.

In the improved pressurized water nuclear power plant described above, however, the bottom of the crossover leg, that is the low-temperature side pipe P1 connecting the low-temperature side water chamber of the steam generator 3' and the reactor coolant pump 5, remains below the upper portion of the nuclear core 7 as shown in FIG. 10.

For this reason, in the conventional pressurized water reactor plant, a water stagnant or staying in the crossover leg tends to increase a back pressure in a core when a pipe breaking accident of smaller scale occurs at the outlet side of the reactor coolant pump 5. Such a rise in the back pressure tends to block a supply of water into a nuclear core, when an emergency core cooling water is poured into the primary cooling system, reducing the cooling of the nuclear core.

BRIEF SUMMARY OF THE INVENTION

A principle object of this invention is to provide a pressurized water reactor plant in which cooling of the nuclear core is efficiently performed whatever loss of coolant accident occurs, thereby improving the safety of the plant.

To this end, the present invention resides in a pressurized water reactor plant comprising a reactor vessel, a horizontal steam generator including U-shaped heat transfer tubes, a reactor coolant pump, and coolant pipes each providing a fluid communication therebetween, characterized in that the horizontal steam generator, the reactor coolant pump, and the coolant pipes are arranged above the uppermost end of a nuclear core formed in the reactor vessel.

The pressurized water reactor plant in accordance with the present invention is further characterized in that each of the coolant pipes is formed so as to extend in generally lateral directions.

The pressurized water reactor plant in accordance with this invention is furthermore characterized in that the horizontal steam generator has a high-temperature side water chamber receiving reactor coolant from the reactor vessel through the reactor coolant pump and a low-temperature side water chamber returning reactor coolant flow into the reactor vessel, the high-temperature side water chamber being above the low-temperature side water chamber.

The pressurized water reactor plant in accordance with the present invention is also characterized in that the horizontal steam generator comprises a horizontally extending shell, a tube bundle of U-shaped heat transfer tubes extending horizontally and supported in a shell, a moisture separator arranged above the tube bundle in the shell, a vertical partition plate transversely disposed in the shell so as to divide the interior of the shell into a U-shaped pipe region and a straight pipe region, and a steam drain pipe extending from the moisture separator and being open to the U-shaped pipe region.

The pressurized water reactor plant in accordance with the present invention is further characterized in that the horizontal steam generator further includes a pair of separator plates each disposed between the tube bundle and the shell so as to define a feedwater downcomer, and a feedwater inlet pipe opens in the feedwater downcomer.

According to this invention, the heat generated in the nuclear core in the reactor vessel is conveyed by the coolant in the normal operation of the plant. The coolant flows through outlet nozzles from the reactor vessel into the high-temperature side water chamber portion of the steam generator by means of the coolant pump. It flows in the U-shaped heat transfer tubes in a generally horizontal direction, reaching the low-temperature side water chamber, and then returns to the reactor vessel via the inlet nozzle of the reactor vessel. In the steam generator, the reactor coolant is cooled by feedwater or secondary coolant and the feedwater is changed into steam.

In the event of a postulated accident, for example, a trip of a reactor coolant pump, an output operation of a reactor is stopped as generally known. Even in such a condition, a reactor coolant in a core is continuously heated because decay heat is generated in the nuclear core. The coolant in the reactor vessel flows through an outlet nozzle by itself because of the properties of hotter and lighter fluid tending to flow upwardly, reaching the steam generator through a coolant pump, and then returns to the reactor vessel by natural circulation. Any stagnation of the coolant does not block or suppress this natural circulation because the coolant pump, the steam generator, and the coolant pipes connecting them with each other are above the nuclear core.

In a steam generator, since the high-temperature side water chamber portion is above the low-temperature water chamber portion, the coolant cooled by the feedwater moves smoothly to the low-temperature side water chamber portion through the straight tube portion and the U-shaped tube portion of the heat transfer tube; in other words, the natural circulation is promoted.

In addition, the heat flux of the U-shaped tube portion having a large area of liquid contact is decreased by controlling the recirculation ratio of the feedwater in the straight pipe region and the tube bundle region so as to carry out a heat removal of high flux in the straight pipe region, when pipe support/partition plates are disposed across the tube bundle, and a pair of partition plates are disposed on the opposite sides of the bundle, and feedwater is supplied to a space or downcomer defined by the partition plates. Thus, the flow rate crossing the U-shaped tube portion is decreased and therefore flow induced vibration of the tubes is extremely reduced.

According to the present invention, the conventional crossover leg is eliminated because the coolant pump, the steam generator, and the coolant pipes connecting them with each other are arranged above the nuclear core as described above. Therefore, the coolant cannot be stagnant anywhere in the primary cooling line, and the natural circulation is not blocked, resulting in an improvement in the safety of the plant. Moreover, the piping route is simplified, which improves the economy of the plant. Since the high-temperature side water chamber portion of the steam generator is positioned above the low-temperature side water chamber portion, the primary or reactor coolant cooled by the feedwater moves smoothly to the low-temperature side water chamber portion through the straight tube portion and the U-shaped tube portion of the heat transfer tube; in other words, the natural circulation is promoted with an improvement in the cooling effect of the nuclear core. Therefore, in the event of a breakage accident in a smaller pipe, the nuclear core is kept in the water and effectively cooled.

BRIEF DESCRIPTION OF THE DRAWINGS

The invention will now be described in detail with reference to the accompanying drawings wherein

FIG. 7a is a partially cross-sectional view showing an vibration proof construction which can be used in the steam generator shown in FIG. 4;

FIG. 7b is an enlarged view of the detail of encircled portion A in FIG. 7a;

FIG. 8b is an enlarged view of the detail of encircled portion B in FIG. 8a;

DETAILED DESCRIPTION OF PREFERRED EMBODIMENTS

A preferred embodiment of the present invention will be described in detail with reference to the accompanying drawings; wherein like reference characters designate like or corresponding parts.

Figure 1:
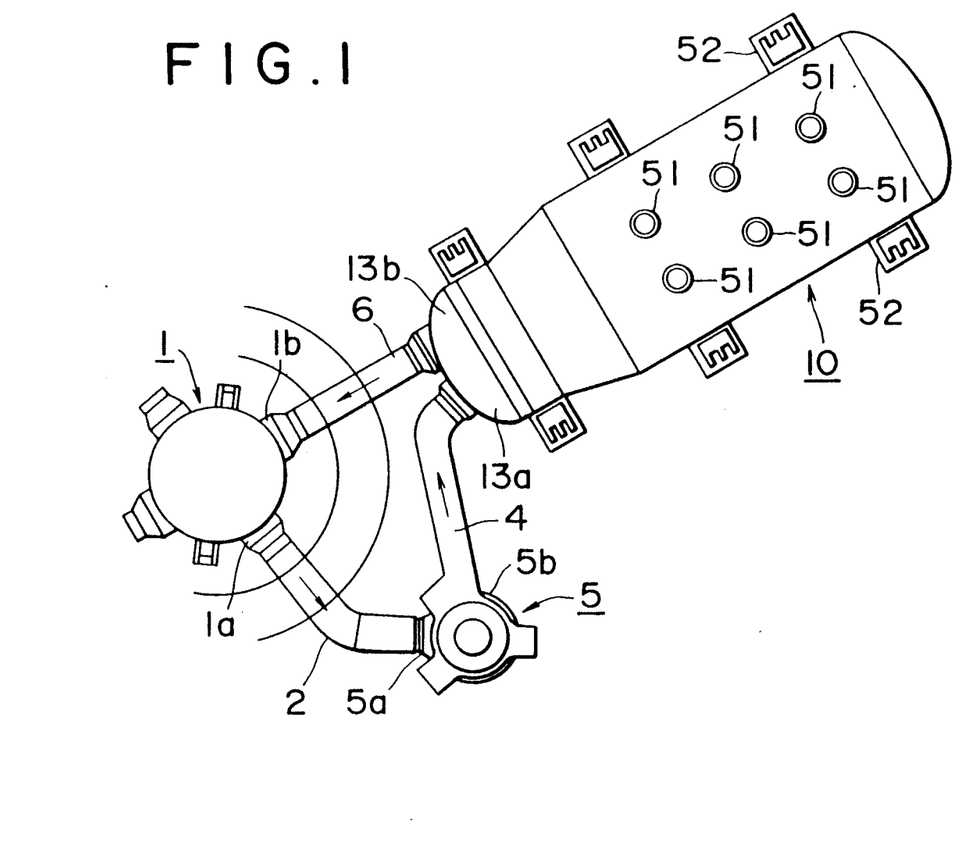
FIG. 1 is a schematic plan view of the main portion of a pressurized water reactor plant in accordance with one embodiment of the present invention.
Figure 2:
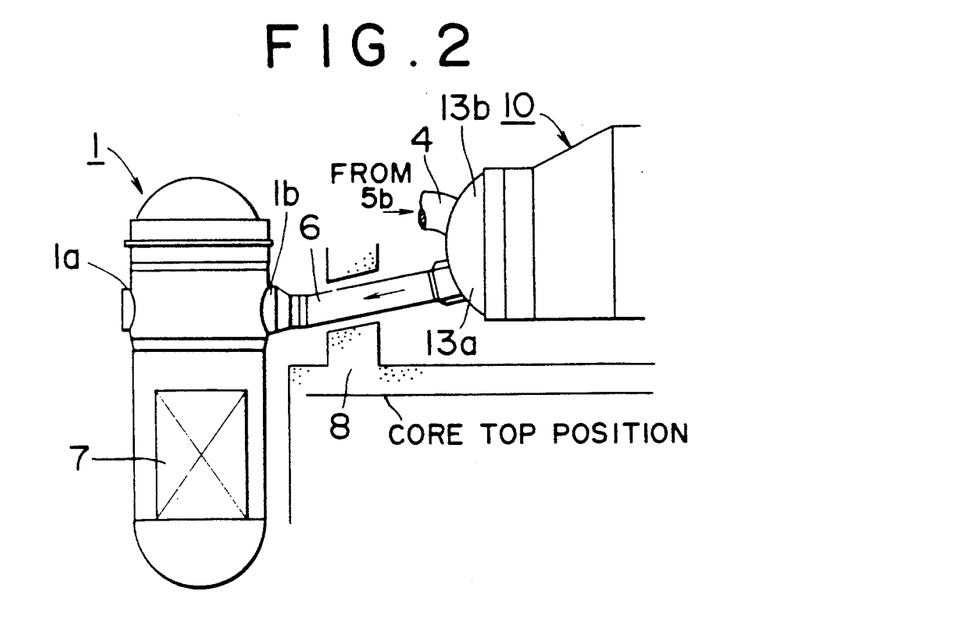
FIG. 2 is a schematic elevational view showing the connecting and positional relationship between a reactor vessel and a horizontal steam generator in the pressurized water reactor plant shown in FIG. 1.

FIG. 1 is a schematic plan view of the primary cooling system of a pressurized water reactor plant in accordance with the present invention. FIG. 2 is a schematic elevational view showing the geometrical relationship between a reactor vessel and a horizontal steam generator, and FIG. 3 is a schematic elevational view showing the relationship between a reactor coolant pump and the horizontal steam generator in the pressurized water reactor plant shown in FIG. 1, respectively.

Figure 3:
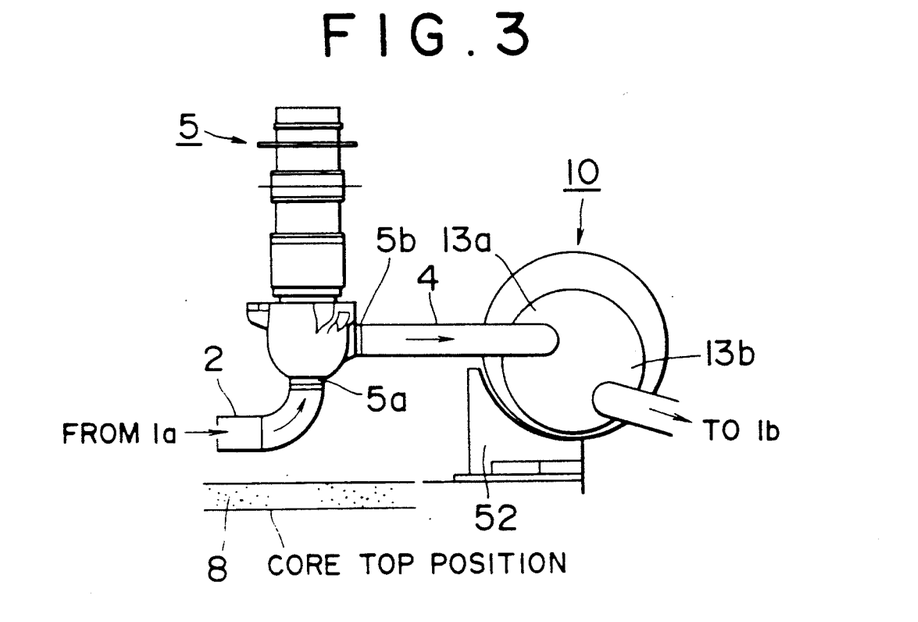
FIG. 3 is a schematic elevational view showing the connecting and positional relationship between a reactor coolant pump and a horizontal steam generator in the pressurized water reactor plant shown in FIG. 1.

Referring now to FIGS. 1 through 3, a reactor vessel 1 including a nuclear core 7 has an outlet nozzle 1a and an inlet nozzle 1b. The outlet nozzle 1a is connected to a suction port 5a of a reactor coolant pump 5 via a first high-temperature side pipe 2, and a discharge port 5b of the coolant pump 5 is connected to a high-temperature side water chamber portion 13a of a horizontal steam generator 10 via a second high-temperature side pipe 4. The low-temperature side water chamber portion 13b of the steam generator 10 is connected to the inlet nozzle 1b of the reactor vessel 1 via a low-temperature side pipe 6.

As shown in FIGS. 1 through 3, the high-temperature side pipe 2 with one end connected to the outlet nozzle 1a, passes through a concrete wall 8 and extends from the outlet nozzle 1a in a substantially horizontal plane (may be slightly upward), and the other end thereof is bent upward at an angle of about 90°. The other end of the high-temperature side pipe 2 is connected to the suction port 5a formed on the bottom of the reactor coolant pump 5. Thus, both the high-temperature side pipe 2 and the coolant pump 5 are positioned above the nuclear core 7.

The discharge port 5b of the coolant pump 5 is positioned above the suction port 5a. The high-temperature side pipe 4 connected to the discharge port 5b extends in a substantially horizontal plane, and is connected to the inlet nozzle disposed at the high-temperature side water chamber portion 13a of the steam generator 10. The low-temperature side water chamber portion 13b of the steam generator 10 is positioned below the high-temperature side water chamber portion 13a, but above the nuclear core 7. Therefore, the low-temperature side pipe 6, which connects the outlet nozzle at the low-temperature side water chamber portion 13b to the inlet nozzle 1b of the reactor vessel 1, has no portion which is below the top of the nuclear core 7, and extends between the reactor vessel 1 and the steam generator 10, passing through the aforementioned wall 8.

In this embodiment, the low-temperature side pipe 6 is inclined downward toward the inlet nozzle 1b of the reactor vessel 1 because the difference in height between the suction port 5a and the discharge port 5b of the coolant pump 5 is larger than that in height between the inlet nozzle and outlet nozzle of the steam generator 10. The inclination of the pipe is not needed when there is substantially no difference in height thereof.

By the arrangement described above in the primary cooling system, the steam generator 10 which recirculates a reactor coolant to the nuclear core, the reactor coolant pump 5, the high-temperature side pipes 2 and 4 each of which connects the coolant pump 5, and the low-temperature side pipe 6 are all positioned above the nuclear core 7.

Various influences on pump performance caused by the change in position of reactor coolant pump from the low-temperature side (about 290° C.) to the high-temperature side (about 320°–325° C.) as described above according to the present invention were evaluated. The evaluation shows that concerning the effective suction head of the coolant pump 5, a sufficient head can be maintained, even when a transition event occurs, by slightly adjusting a set point for a pump trip. The reactor coolant pump 5 which is now used widely includes a controlled leakage type shaft seal and a mechanical seal fit around a drive shaft of impellers. Concerning the seal properties of the pump, it was found that a slight increase in the amount of seal water and cooling water is sufficient to keep a required sealing performance: it is true even in a loss of all power that the sealing is secured by improving the heat resistant property of seal member material. In FIGS. 1 through 4, reference numeral 51 designates steam outlets, and 52 designates a support of steam generator 10.

Figure 4:
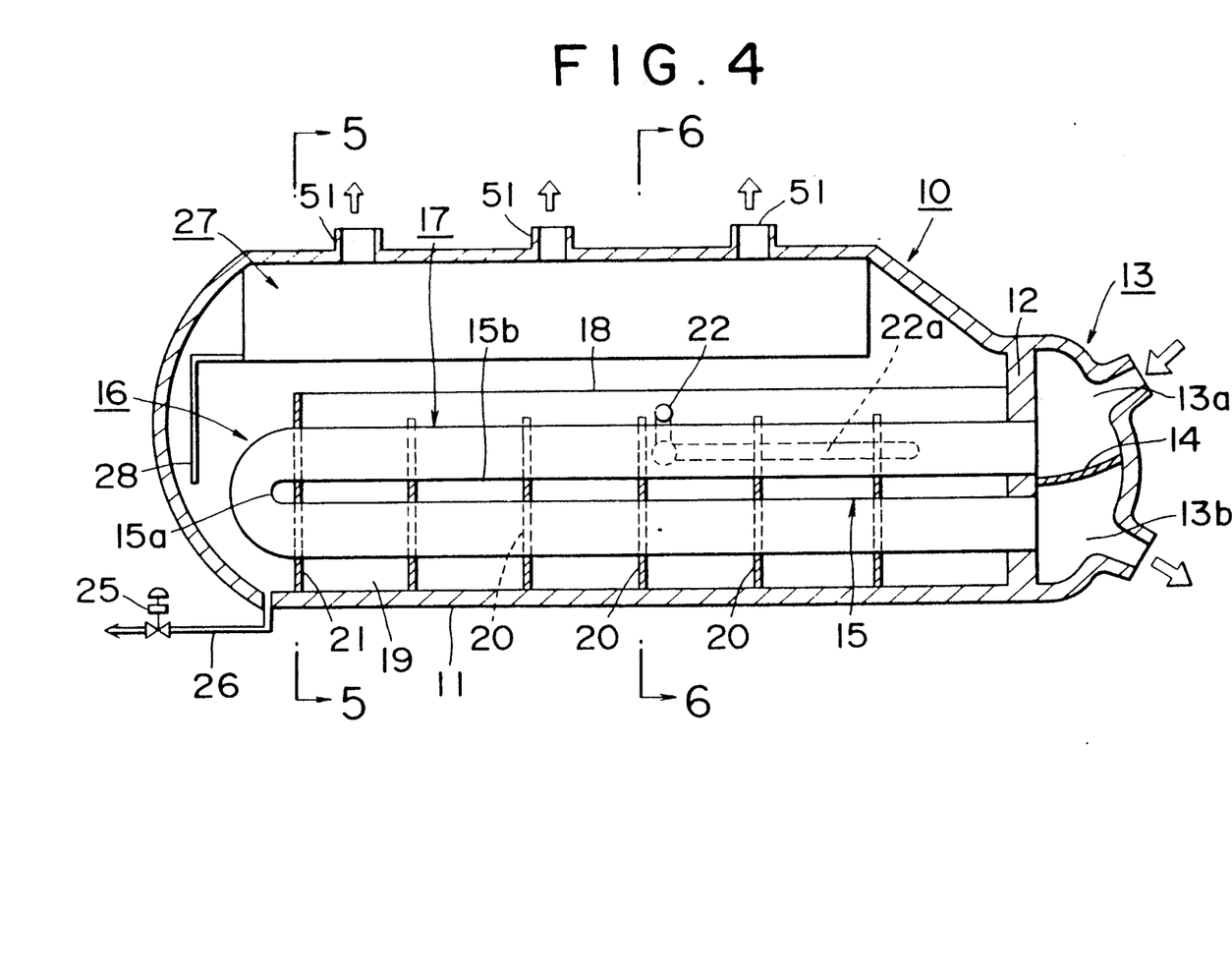
FIG. 4 is a cross-sectional view of a steam generator used in the pressurized water reactor plant shown in FIG. 1.
Figure 5:
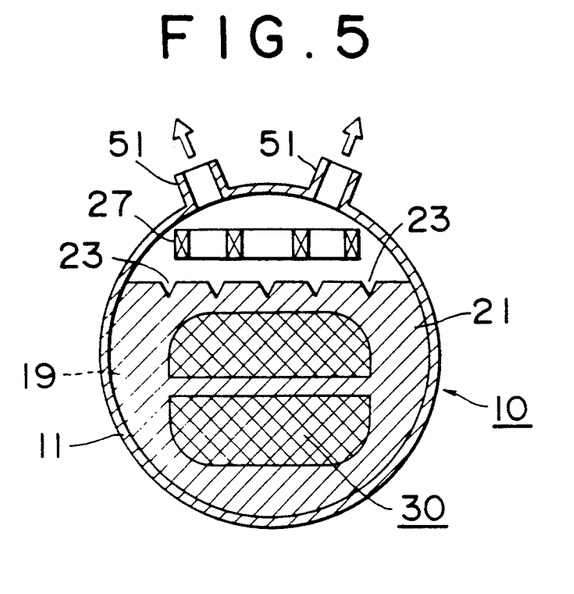
FIG. 5 is a cross-sectional view taken along the line 5—5 of FIG. 4.
Figure 6:
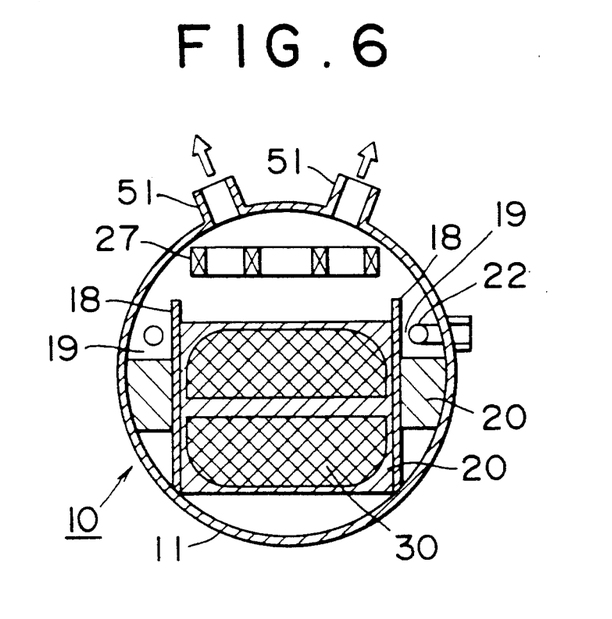
FIG. 6 is a cross-sectional view taken along the line 6—6 of FIG. 4.

Next, the detailed structure of a U-shaped tube type horizontal steam generator, which is used in the primary cooling system of the aforementioned pressurized water reactor plant will be described with reference to FIGS. 4 through 8. As shown in FIGS. 4 through 6, the horizontal steam generator 10 has a horizontally extending, substantially cylindrical shell 11 and a water chamber 13 separated from an interior of the shell 11 by a tube plate 12. The water chamber 13 is divided into the upper high-temperature side water chamber portion 13a and the lower low-temperature side water chamber portion 13b by a separator plate 14. The upper water chamber portion 13a communicates with the high-temperature side pipe 4 shown in FIG. 1, and the lower water chamber portion 13b communicates with the low-temperature side pipe 6 shown in FIG. 1.

A large number of U-shaped heat transfer tubes, which are supported and secured in the shell 11 and compose a tube bundle 30, communicate with the high-temperature side water chamber portion 13a at one end thereof extending through the tube plate 12. The straight portion of the heat transfer tubes extends in the substantially horizontal direction, and the tubes also have a U-shaped portion. Then, such tubes extending straight and bent in a U-shape communicate with the low-temperature side water chamber portion 13b at the other end. Reference numeral 16 generally designates a U-shaped pipe region where the U-shaped tube portion 15a of heat transfer tubes 15 lies, and 17 generally designates a straight pipe region where the straight tube portion 15b of heat transfer tubes 15 lies.

In the shell 11, as best shown in FIG. 6, a pair of separator plates 18 are vertically extended so as to position the straight tube portion 15b of heat transfer tubes 15 therebetween. The separator plate 18 and an inside surface of the shell 11 define a space 19 opening upwardly as a downcomer where feedwater flows down. The heat transfer tubes 15 are supported by a plurality of vertical tube support plates 20 at the straight tube portion 15b. The boundary between the U-shaped tube portion 15a and the straight tube portion 15b is divided by a tube support/partition plate 21 which also has a function of supporting the heat transfer tubes 15. In this manner, the tube support/partition plate 21 cooperates with the inside surface of the shell 11 to separate the U-shaped pipe region 16 from the straight pipe region 17. Each tube support plate 20 extends outward in the radial direction passing through the separator plate 18 as shown in FIG. 6. However, the vertical dimension of the tube support plates 20 decreases in the aforementioned space 19. Therefore, the feedwater supplied from the feedwater inlet 22 in the shell 11 via a feedwater pipe 22a into the space 19 can flow laterally (in the right-and-left direction in FIG. 4) in the space 19, but does not flow directly to the U-shaped pipe region 16 because of the presence of the tube support/partition plate 21.

As shown in FIG. 5, the tube support/partition plate 21 is fixed to the inside surface of the shell 11 along the periphery except for the upper part so as to separate the aforementioned space 19 from the U-shaped pipe region 16. At the upper end of the tube support/partition plate 21, a plurality of V-shaped notches 23 are formed so that the normal water level of the tube bundle 30 is kept approximately at the bottom of the notch 23. The shape (size and depth) of the notch 23 is finally determined depending on the concentration of water content in the U-shaped pipe region 16 and the straight pipe region 17. The shape of the notch 23 shown in FIG. 5 is merely one example. When the concentration ratio in the U-shaped pipe region 16 is to be increased, it is preferable that design be made so that the bottom of the notch 23 is positioned above the normal water level of the tube bundle 30.

As shown in FIG. 4, a blowdown pipe 26 having a discharge flow rate control valve 25 is installed at the left of the tube support/partition plate 21 on the bottom of the shell 11. Therefore, a blowdown operation is usually performed from the U-shaped pipe region 16, in which impurities in the water are predominantly concentrated. Above the U-shaped pipe region 16 and the straight pipe region 17 in the shell 11, a moisture separator 27 is disposed and extends horizontally, and the drain pipe 28 connected to the bottom of the moisture separator 27 is open to the U-shaped pipe region 16. Therefore, the return water having a high concentration of impurities is returned from the moisture separator 27 to the U-shaped pipe region 16.

The water level control in the straight pipe region 17, which is performed to maintain the normal water level at the level near the bottom of notch 23 of the partition plate 21, is carried out by means of a main feedwater control system (not shown) as done in the conventional system. The water level control in the U-shaped pipe region 16 is carried out by the water level control operation for the straight pipe region 17 and continuous or intermittent control of a discharge flow rate through the blowdown pipe 26. When the water level in the straight tube portion 17 is raised, the feedwater overflows and flows into the U-shaped pipe region 16 through the notches in the tube support/partition plate 21, resulting in an increase in water level in the U-shaped pipe region 16. When a blowdown operation is performed by opening the discharge flow rate control valve 25, the water level in the U-shaped pipe region 16 lowers. In the U-shaped pipe region 16, the concentration of water 2 to 10 times that in the straight pipe region 17 can be performed by the control described above. By discharging the concentrated water from the U-shaped pipe region 16, the concentration of impurities in bulk water in the straight pipe region 17 is reduced.

Figures 7A, 7B:
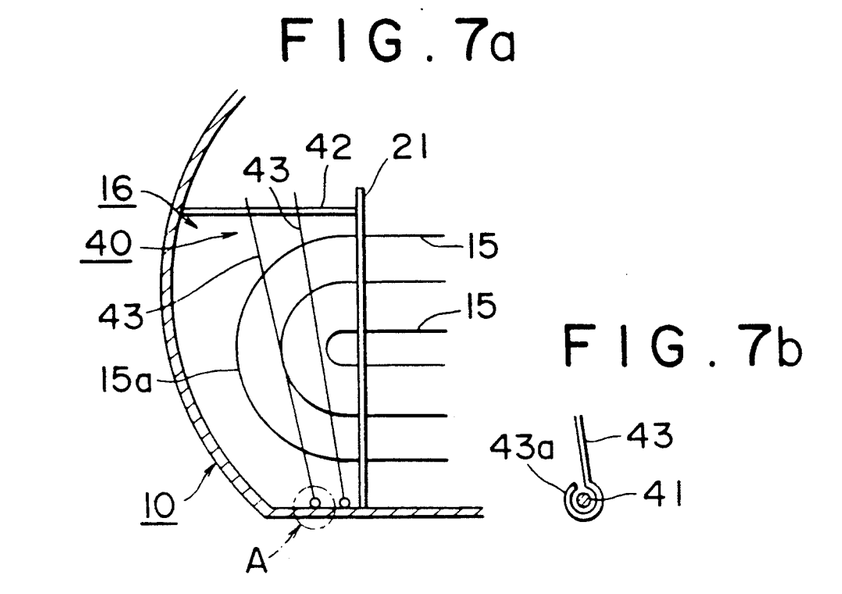
Figure 8A:
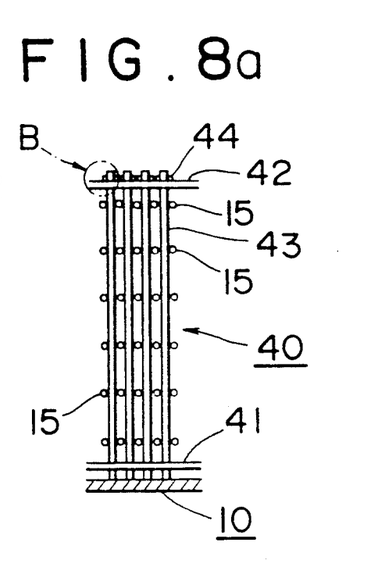
FIG. 8a is an enlarged detailed view of the vibration-proof construction shown in FIG. 7.
Figure 8B:
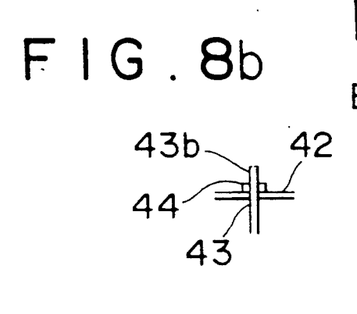

FIGS. 7 and 8 show an antivibration device 40 for the U-shaped tube portion 15a. As described above, since the feedwater does not flow directly into the U-shaped pipe region 16, the flow rate of feedwater crossing the heat transfer tubes 15 is very low. Therefore, flow induced vibration of the tubes are suppressed so that simplification of the antivibration device 40 can be accomplished. In the embodiment shown in FIGS. 7 and 8, the antivibration device 40 comprises a plurality of rod-shaped members 43. The lower end 43a of the antivibration device 40 is pivotally mounted to a hinge rod 41 extending along the shell bottom of the horizontal steam generator 10. The upper end 43b of the antivibration device 40 is fixed to a fixed plate 42 extending horizontally crossing the upper portion of the U-shaped pipe region 16 from the vicinity of the top of the tube support/partition plate 21. The lower end 43a of the rod-shaped member 43 is formed into a hook shape to clasp the hinge rod 41, and the upper end 43b thereof consists of a threaded portion so as to threadedly engage with a nut 44. When the lower end 43a of the rod-shaped member 43 is pivotally mounted as described above, it is preferable that the upper end 43b be moved several centimeters at each regular inspection to prevent concentration at a particular portion on the rod-shaped member 43. Needless to say, both of the ends of rod-shaped member 43 may be fixed.

When the antivibration device 40 is constructed as described above, it can be removed if necessary, which facilitates the inspection of the U-shaped tube portion 15a. Also, the position of the rod-shaped member 43 can be changed at each regular inspection to make adjustment so that it does not contact the heat transfer tubes 15 at the same positions as before.

I claim:

1. In a pressurized water reactor plant including a reactor vessel, a reactor coolant pump having an inlet and an outlet, a coolant pipe connecting an outlet of the reactor vessel to the coolant pump inlet, a horizontal steam generator having U-shaped heat transfer tubes and an inlet and an outlet, a coolant pipe connecting the coolant pump outlet to the steam generator inlet, and a coolant pipe connecting the steam generator outlet to an inlet of the reactor vessel, so that coolant water is pumped by the coolant pump from the reactor vessel through the steam generator heat transfer tubes and returned from the steam generator to the reactor vessel, the improvement wherein:

said reactor vessel comprises a nuclear core formed therein having an uppermost end;

said reactor coolant pump, said steam generator and said coolant pipes are positioned at an elevation higher than said uppermost end of said nuclear core; and said steam generator comprises a horizontally extending shell, a tube bundle of U-shaped heat transfer tubes supported and extending horizontally in said shell and having straight tube portions and a U-shaped portion, a moisture separator in said shell and disposed above said tube bundle, a vertical partition plate disposed transversely in said shell and dividing the interior of said shell into a U-shaped tube region and a straight tube region, and a drain pipe extending from said moisture separator to said U-shaped tube region for draining impurities from said moisture separator to said U-shaped tube region.

2. The pressurized water reactor plant as claimed in claim 1 and further comprising:
   a pair of separator plates, each separator plate of said pair of separator plates being disposed between said tube bundle and said shell and defining a feedwater downcomer; and
   a feedwater inlet pipe having an outlet end connected to said feedwater downcomer.

3. The pressurized water reactor plant as claimed in claim 1, wherein:
   each of said coolant pipes is formed to extend in lateral directions.

4. The pressurized water reactor plant as claimed in claim 1, wherein said steam generator further comprises:
   a high-temperature side water chamber communicating with said steam generator inlet; and
   a low-temperature side water chamber disposed below said high-temperature side water chamber and communicating with said steam generator outlet.

5. The pressurized water reactor plant as claimed in claim 2 wherein said steam generator further comprises:
   a high-temperature side water chamber communicating with said steam generator inlet; and
   a low-temperature side water chamber disposed below said high-temperature side water chamber and communicating with said steam generator outlet.

6. The pressurized water reactor plant as claimed in claim 4, wherein:
   each of said coolant pipes is formed to extend in lateral directions.

* * * * *